R. G. LINDENBERGER.
MEANS FOR PREVENTING THE FLOW OF WATER THROUGH A WATER SYSTEM.
APPLICATION FILED JULY 8, 1907.
922,300.
Patented May 18, 1909.
3 SHEETS—SHEET 1.
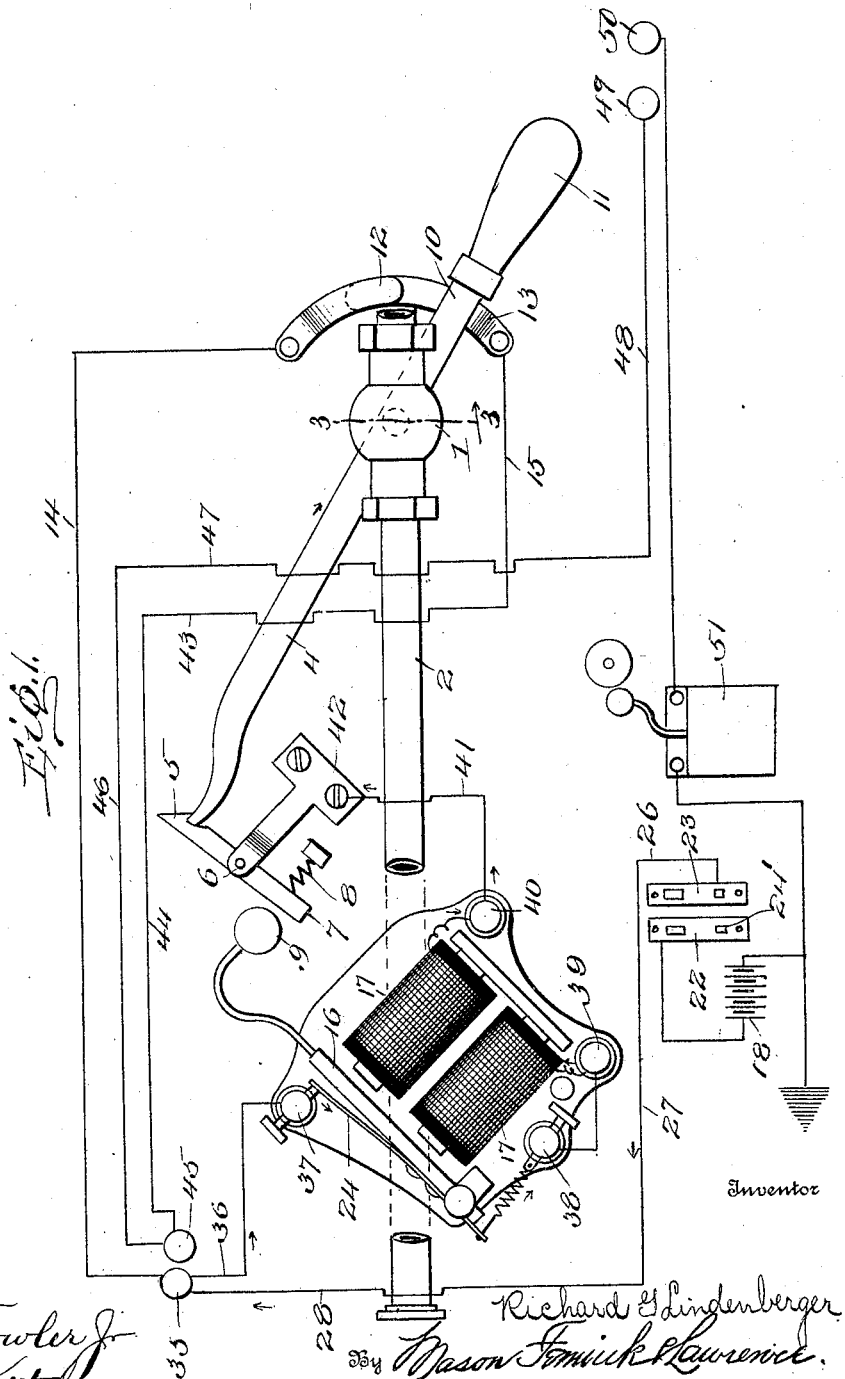

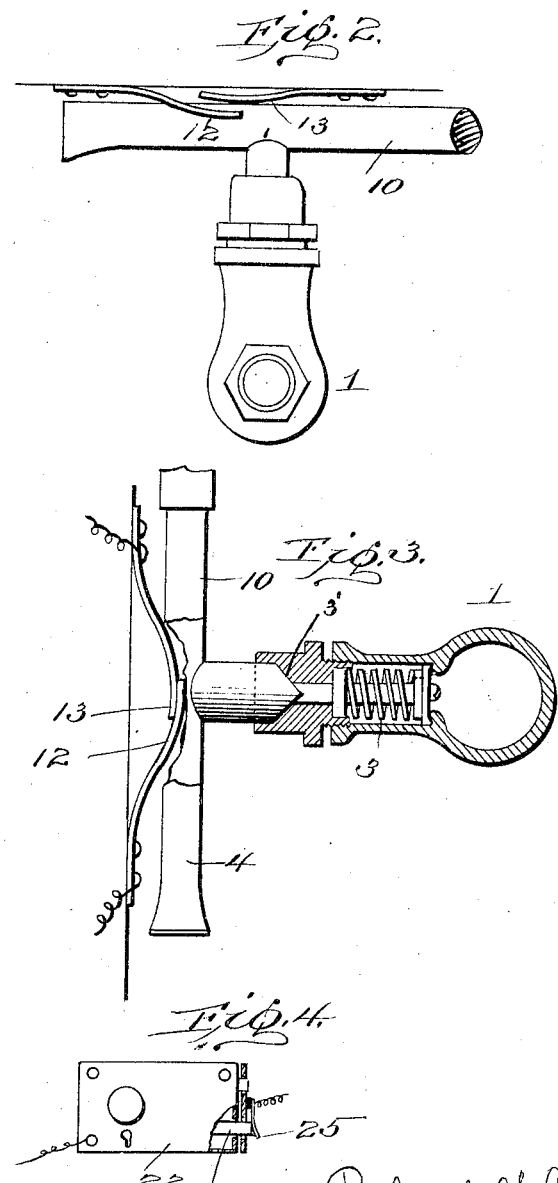

R. G. LINDENBERGER.
MEANS FOR PREVENTING THE FLOW OF WATER THROUGH A WATER SYSTEM.
APPLICATION FILED JULY 8, 1907.
922,300.
Patented May 18, 1909.
3 SHEETS—SHEET 3.
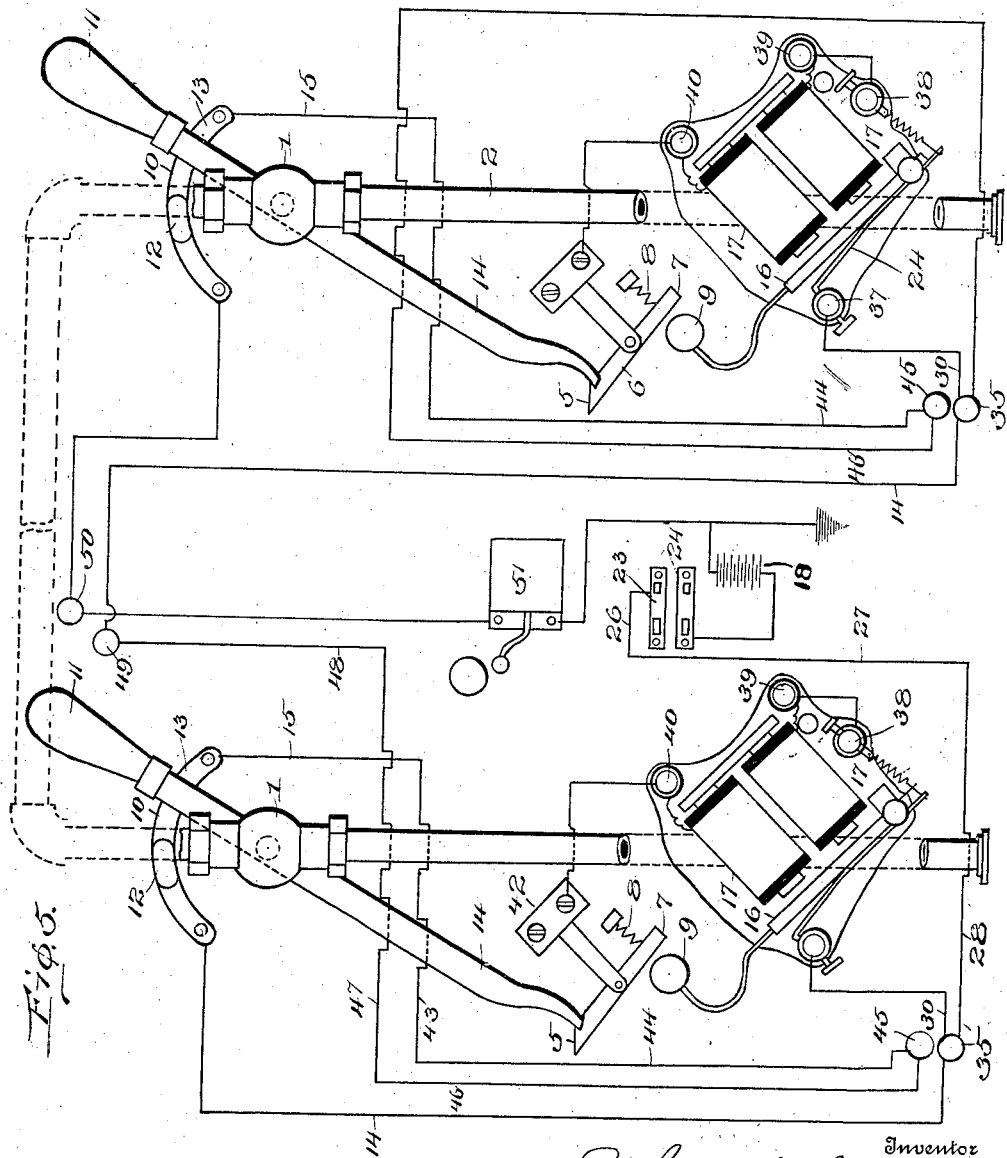
Witnesses
G. F. Toroor.
A. S. Ritchin.
Inventor
Richard G. Lindenberger
By Mason Fenwick Lawrence
his Attorneys

UNITED STATES PATENT OFFICE.

RICHARD G. LINDENBERGER, OF NEW YORK, N. Y.

MEANS FOR PREVENTING THE FLOW OF WATER THROUGH A WATER SYSTEM.

No. 922,300.

Specification of Letters Patent.

Patented May 18, 1909.

Application filed July 8, 1907. Serial No. 382,691.

*To all whom it may concern:*

Be it known that I, RICHARD G. LINDENBERGER, citizen of the United States, residing at New York city, in the county of New York and State of New York, have invented certain new and useful Improvements in Means for Preventing the Flow of Water Through a Water System; and I do hereby declare the following to be a full, clear, and exact description of the invention, such as will enable others skilled in the art to which it appertains to make and use the same.

This invention relates to improvements in means for preventing the flow of water through a system of pipes, and particularly means that will shut off the flow of water and also sound an alarm whenever desired.

The invention comprises the production of a valve for permitting the flow of water through a building or the like in any convenient manner, means for holding said valve in position for preventing the flow of water, and electrical means for permitting said means to operate when the lock of the building has been operated.

The object in view is to provide a valve at the point of supply of water to a building or the like which is normally held in an open position by means of a lever and hook in contact therewith, the hook being designed to be forced out of contact with the lever by the operation of an armature of a magnet which in turn is energized by current from any suitable source when the circuit is completed by the throwing of the bolt in the lock of the door of the building.

Another object in view is the production of a device that will ordinarily permit water to flow through the water system of a building or the like but will upon the locking of the door of the building shut off the flow of water and sound an alarm.

Another object in view is the production of a manually operated valve for controlling the flow of water in a water system, means for normally holding the valve open, electric operative means for releasing the valve and a pair of springs designed to be held apart while the valve is open and to be permitted to come in contact when the valve is closed for providing a circuit through which current may flow for operating another valve.

A still further object in view is the production of a valve that has a normal tendency to close for controlling the flow of water through a water system, means for holding the valve open, electrically operated means for releasing the valve and a circuit for the electrically operated means that is designed to be closed whenever desired, which in turn will operate the valve, and the valve in closing will also permit a circuit to be formed for sounding an alarm.

With these and other objects in view the invention comprises certain other novel constructions, combinations and arrangements of parts which are hereinafter more fully described and claimed.

In the accompanying drawing:—Figure 1 is a diagrammatical view of one embodiment of the present invention. Fig. 2 is an end view of a pair of contacting springs and surrounding mechanism forming a part of the present invention, the springs being shown as held separate. Fig. 3 is a section through Fig. 1 on line 3, 3, looking in the direction of the arrow, the valve being shown in its closed position. Fig. 4 is a front view of a lock with a portion broken away. Fig. 5 is a diagrammatic view of the invention, a plurality of operating mechanisms being disclosed for showing the successive operation of the same.

In constructing a device in accordance with the present invention I provide a valve 1 that is secured in position on pipe 2 at any desired point. The pipe 2 is part of the water distributing system of a house or the like and may be any length, size and shape without departing from the spirit of the present invention. Any number of valves 1 may be positioned at various places through the system which are operated in a similar manner to the valve 1. The valve 1 automatically is held closed by a spring 3; but normally the valve 1 is held in an open position by having its arm or lever 4 which is provided with an inner cam face 3' and is adapted to raise the valve stem engaging a hook 5 which is pivotally mounted at 6 to any convenient structure. The hook 5 is formed with an arm or trigger 7 that is normally pressed by spring 8, so as to have the hook pressed by spring 8, so as to have the hook 5 always in position for engaging lever 4. The arm or trigger 7 is designed to be forced down by a hammer or member 9 operated by means hereinafter fully described. When arm or trigger 7 is forced down hook 5 will be forced upward and out of engagement with lever 4 so that spring 3 will quickly rotate or close valve 1 and consequently shut off or stop the water from flowing through pipe 2.

Lever 4 is preferably formed integral with an extension or continuation 10 to which is secured a grip or handle 11 that is designed to be operated manually for setting the device, that is, for forcing the same to the position shown in Fig. 1 and permitting catch 5 engaging lever 4. It will be evident that so long as catch or hook 5 engages lever 4 valve 1 will remain open. Positioned near valve 1 is a pair of springs 12 and 13 that are designed to normally contact with each other. Spring 13 however is in the path of movement of extension 10 so that when lever 4 is in engagement with hook or catch 5, extension 10 will depress spring 13 and force the same out of contact with spring 12. This will hold open the circuit of wires 14 and 15.

Arm 7 of hook or catch 5 is operated by member 9 as heretofore described and member 9 in turn is vibrated by movement of armature 16. Armature 16 is moved by magnets 17 which are designed to receive current from battery 18 through a circuit hereinafter more fully set forth.

Interposed in the circuit of magnet 17 is a lock 22 and its keeper 23. The lock and keeper may be of any convenient kind, preferably the lock and keeper of the door of the building to which the device is applied. The lock 22 is connected with battery 18 for receiving current therefrom and is designed to let current pass from the bolt or locking member 24' to a spring 25 and then through the wires 26, 27, 28, binding post 35, wire 36, binding post 37, vibrator 24, and armature 16, tension member 38, binding post 39, electro magnets 17, binding post 40, wire 41, hook supporting member 42, catch or hook 5, lever 4 and to ground through valve 1. This circuit is traced with the assumption that locking member 24 is in contact with spring 25 for if the same were open the current would not flow, but being closed would flow as just indicated, and flowing in this circuit will cause armature 16 to vibrate and consequently disengage catch 5 from lever 4. When lever 4 is disengaged it will permit valve 1 to be closed as heretofore described. This will cut out current from electro magnets 17 as the circuit is broken between hook 5 and arm 4. Though the circuit is broken that permits current to pass through magnet 17 a new circuit is established by extension 10 moving off of spring 13 and thus permitting the same to contact with spring 12. When springs 12 and 13 have thus been brought in contact with each other current will flow from battery 18 through lock 22, bolt 24, spring 25, wires 26, 27, and 28, binding post 35, wire 14, spring 12, spring 13, wires 15, 43, 44, binding post 45, wires 46, 47 and 48 to binding post 49 which is similar to binding post 35, but upon another set of similar devices in another part of the building so that the current may flow from battery 18 through the circuit traced to another set of magnets similar to 17 for closing another valve similar to 1 in another set. In this connection it will be observed that any number of devices may be used and connected in this manner as shown in Fig. 5, so that when any one is set in operation, all of the various sets will operate and close all the valves The current passing 49 flows through a set of magnets similar to magnet 17 and is grounded upon pipe 2 in a similar manner to the current passing through magnets 17. After all the various valves 2 have been shut off, current will pass to binding post 50 and the contacting of the last pair of springs similar to 12 and 13 provides a path for current for bell 51 which may be of any desired structure, but is preferably designed to be of such structure that when current passes from binding post 50 through the bell it will operate the same for a short while, and will then switch off the current.

It will be observed that from binding post 49 current is passed through an adjoining system or set as may be desired having valves similar to valve 1. After the last valve, similar to valve 1, has been shut off, current will be switched onto binding post 50 by the closing of the last set of springs 12 and 13 so as to provide current for the operating of bell 51. It will also be noted that any number of devices may be used in a building or system and when any one is cut out current is supplied to the remaining set of devices for turning off the valves thereof. After the last valve has been cut off current is supplied to an alarm for providing a signal that indicates that all of the valves similar to valve 1 have been closed.

What I claim is:—

1. A device of the character described, comprising a water system, a valve interposed in the pipes of said system, a lever having a handle section formed integral with said valve, springs one of which, is adapted to contact with said lever, electrical connections with said springs, a spring controlled catch arm adapted to engage one end of said lever, means for supporting said arm, a magnet having an armature provided with a projecting hammer adapted to strike said arm, a circuit in which the magnet is interposed and a bolt provided with a switch for controlling said circuit.

2. In a device of the character described, comprising a water system, an automatic valve interposed in the pipes of said system, a cross arm formed integral with the revoluble portion of the valve and provided with a handle at one end and a narrowed portion at the opposite end, a trigger normally contacting with the narrowed end of said arm, a magnet armature extension adapted to strike said trigger, a plurality of contact springs one of which is adapted to be engaged by said arm, a lock member provided with electrical connections, and an electrical circuit in which the magnet is interposed.

3. In a device of the character described, comprising a water system, an automatic valve, a cross-arm integral with the movable projecting portion of the valve, a pivotally connected arm releasably controlling said cross-arm, a release for said pivoted arm, a magnet for operating said release, an electrical switch operated by said cross-arm, an alarm controlled by said switch, a locking member forming an electrical contact, and an electrical circuit controlled thereby and having the magnet interposed therein.

4. In a device of the class described, a water system, a valve interposed in the pipes of said system, a cross arm upon the stem of the valve, a trigger normally engaged with the cross arm, an electro-magnet, an armature for the said magnet provided with a hammer extension, the said extension being adapted to strike the trigger to release the cross arm when the magnet is energized, a second valve, means for controlling said second valve, an electric circuit in which the said means is interposed, and a circuit closing device arranged for actuation by the release of said cross arm to close the said circuit.

5. In a device of the character described, an automatic valve interposed on the pipes of a water system, a cross-arm mounted upon the stem of said valve, a trigger provided at one end with a catch releasably controlling said cross-arm, a magnet, an armature acted upon by said magnet and having a projecting hammer portion adapted to strike said trigger, a switch operated by said cross-arm, an alarm operated by said switch, and electrical connections for said magnet and switch.

In testimony whereof I affix my signature in presence of two witnesses.

RICHARD G. LINDENBERGER.

Witnesses:
 N. LOVE,
 EMIL L. AARON.